United States Patent
Kozlov et al.

(10) Patent No.: US 8,035,083 B1
(45) Date of Patent: Oct. 11, 2011

(54) TERAHERTZ TUNABLE SOURCES, SPECTROMETERS, AND IMAGING SYSTEMS

(75) Inventors: Vladimir G. Kozlov, Eugene, OR (US); Walter C. Hurlbut, Eugene, OR (US)

(73) Assignee: Microtech Instruments, Inc., Eugene, OR (US)

( * ) Notice: Subject to any disclaimer, the term of this patent is extended or adjusted under 35 U.S.C. 154(b) by 742 days.

(21) Appl. No.: 12/099,043

(22) Filed: Apr. 7, 2008

Related U.S. Application Data (60) Provisional application No. 60/910,659, filed on Apr. 7, 2007.

(51) Int. Cl.
*G01J 5/02* (2006.01)
*H01S 3/10* (2006.01)

(52) U.S. Cl. ............... 250/341.1; 250/341.8; 372/22; 359/238

(58) Field of Classification Search ............ 250/341.1, 250/341.8, 493.1; 372/22, 4; 359/326, 238
See application file for complete search history.

(56) References Cited

U.S. PATENT DOCUMENTS

| | | | | |
|---|---|---|---|---|
| 5,367,588 A | * | 11/1994 | Hill et al. | 430/5 |
| 5,761,226 A | * | 6/1998 | Gupta | 372/22 |
| 2008/0156991 A1 | * | 7/2008 | Hu et al. | 250/341.1 |

OTHER PUBLICATIONS

Weiss, C.O., "Frequency Measurement Chain to 30 THz Using FIR Schottky Diodes and a Submillimeter Backward Wave Oscillator," Applied Physics B, vol. 34, pp. 63-67, published 1984; Retrieved from the internet [Jan. 13, 2011]; Retrieved from <http:www.springerlink.com/content/t776tjj6m76684n6/fulltext.pdf>.*
Chramiec, J., "Effect of Embedding Impedance on the Efficiency of Varistor Schottky Diode Frequency Multipliers," Technical University, pp. 1724-1731, published Sep. 9, 1990; Retrieved from the internet [Jan. 13, 2011]; Retrieved from <http://ieeexplore.ieee.org/xpls/absall.jsp?arnumber=4136257>.*
Maiwald et al., "Planar Schottky Diode Frequency Multiplier for Molecular Spectroscopy up to 1.3 THz," IEEE Microwave and Guided Wave Letters, vol. 9, No. 5, May 1999, pp. 198-200; Retrieved from the internet [Jan. 13, 2011]; Retrieved from <http://ieeexplore.ieee.org/xpls/abs_all.jsp?arnumber=766763&tag=1>.*
Moussessian, et al., "A Terahertz Grid Frequency Doubler," IEEE Transaction on Microwave Thoery and Techniques, vol. 46, No. 11, pp. 1976-1973 Nov. 1998; Retrieved from the internet [Jan. 13, 2011]; Retrieved from <http://www.ieeexplore.ieee.org/stamp/stamp.jsp?tp=&arnumber=734528&userType=inst>.*
Miles, et al., "Terahertz Souces and Systems," NATO Science Series, Kluwer Academic Publishers, published Jun. 2001.*

(Continued)

*Primary Examiner* — David Porta
*Assistant Examiner* — Yara Green
(74) *Attorney, Agent, or Firm* — David S. Alavi (57) ABSTRACT

A source of terahertz radiation at a fundamental terahertz frequency is tunable over a fundamental terahertz frequency range, and is coupled into a first waveguide. The first waveguide supports only a single transverse spatial mode within the fundamental terahertz frequency range. A solid-state frequency multiplier receives from the first waveguide the terahertz radiation and produces terahertz radiation at a harmonic terahertz frequency. A second waveguide receives the harmonic terahertz radiation. The tunable terahertz source can comprise a backward wave oscillator with output tunable over about 0.10-0.18 THz, 0.18-0.26 THz, or 0.2-0.37 THz. The frequency multiplier can comprises at least one varistor or Schottky diode, and can comprise a doubler, tripler, pair of doublers, doubler and tripler, or pair of triplers. The terahertz source can be incorporated into a terahertz spectrometer or a terahertz imaging system.

14 Claims, 10 Drawing Sheets

OTHER PUBLICATIONS

Tretyakov et al., "Compact tunable radiation source at 180—1500 GHz frequency range," Inn J. of Infrared and Millimeter Waves, vol. 20(8), p. 1443 (Aug. 1999).

Hesler, et al. "Development and Characterization of an Easy-to-Use THz Source." 16th International Symposium on Space Terahartz Technology, Goteborg, Sweden, May 3, 2005.

* cited by examiner

TERAHERTZ TUNABLE SOURCES, SPECTROMETERS, AND IMAGING SYSTEMS

BENEFIT CLAIMS TO RELATED APPLICATIONS

This application claims benefit of U.S. provisional App. No. 60/910,659 filed Apr. 7, 2007, said provisional application being hereby incorporated by reference as if fully set forth herein.

GOVERNMENT LICENSE RIGHTS

This invention was made with government support under Contract No. W31P4Q-07-C-0140 awarded by Defense Advanced Research Projects Agency (DOD). The government has certain rights in the invention.

BACKGROUND

The field of the present invention relates to terahertz radiation. In particular, terahertz tunable sources, spectrometers, and imaging systems are disclosed herein.

The terahertz (THz) or sub-millimeter-wave region of the electromagnetic spectrum (about 0.1-10 THz) has traditionally represented a relatively under-developed "gap" between the microwave and long-wave infrared regions. Over the last two decades, a new field of spectroscopic sensing and imaging has emerged with the advent of new optoelectronic THz component technology that offers exciting prospects for non-invasive inspection and remote threat detection by combining chemical and biological sensitivity with quasi-optical propagation. Unlike the RF, microwave, and millimeter-wave regions where detection or imaging relies primarily on dielectric contrast, many hazardous materials (e.g. explosives, chemical or biological weapons (CBW) agents, etc.) present characteristic absorption features in the THz frequency range that can be used to detect their presence or to provide enhanced image contrast. Furthermore, unlike optical radiation in the visible and mid-infrared regions, THz radiation is transmitted through a wide range of materials including paper, textiles, wood, plastics, ceramics, etc. Hence, their sub-mm spatial resolution combined with adequate atmospheric transmission provides THz sensors with significant potential for detecting and identifying remote or concealed CBW materials and explosives. A need therefore exists for tunable sources of terahertz radiation, and for spectrometers and imaging systems employing such sources.

SUMMARY

A source of terahertz radiation at a fundamental terahertz frequency is tunable over a fundamental terahertz frequency range, and is coupled into a first waveguide. The first waveguide supports only a single transverse spatial mode within the fundamental terahertz frequency range. A solid-state frequency multiplier receives from the first waveguide the terahertz radiation and produces terahertz radiation at a harmonic terahertz frequency. A second waveguide receives the harmonic terahertz radiation. The tunable terahertz source can comprise a backward wave oscillator with output tunable from about 0.10 THz to about 0.18 THz, from about 0.18 THz to about 0.26 THz, or from about 0.2 THz to about 0.37 THz. The frequency multiplier can comprise at least one varistor or Schottky diode, and can comprise a doubler, tripler, pair of doublers, doubler and tripler, or pair of triplers.

A terahertz spectrometer can comprise the terahertz source and a broadband terahertz detector for receiving a portion of the harmonic terahertz radiation that is reflected from or transmitted by a sample.

A terahertz imaging system can comprise the terahertz source and a terahertz imaging detector array for receiving a portion of the harmonic terahertz radiation that is reflected from or transmitted by a sample and for producing an image therefrom. Alternatively, a terahertz imaging system can comprise a terahertz source, an optical source, nonlinear optical media, beamsplitters, and optical filters for producing upconverted terahertz images that include amplitude and phase information.

Objects and advantages pertaining to tunable terahertz sources, spectrometers, or imaging systems may become apparent upon referring to the exemplary embodiments illustrated in the drawings and disclosed in the following written description and/or claims.

The embodiments shown in the Figures are exemplary, and should not be construed as limiting the scope of the present disclosure and/or appended claims.

DETAILED DESCRIPTION OF EMBODIMENTS

Terahertz Tunable Source

Figure 1:
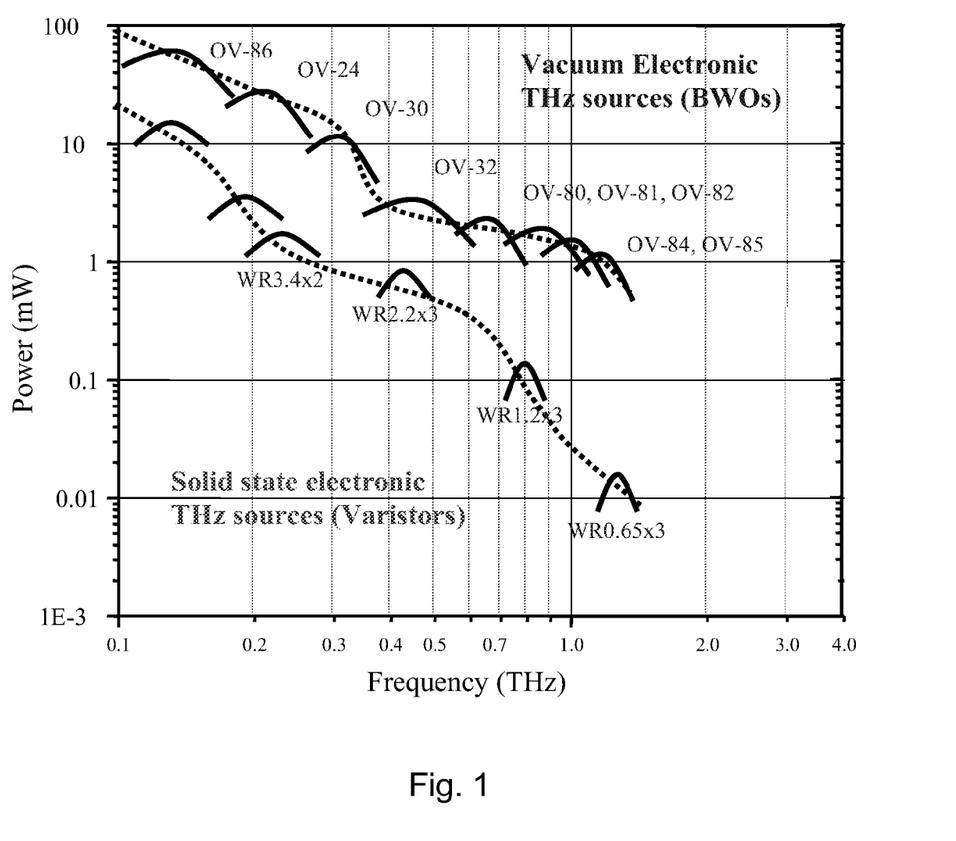
FIG. 1 illustrates frequency range and output power for a variety of terahertz sources.

Vacuum and solid state electronic THz sources have been competing for decades in terms of size, output power, and spectral tunability. FIG. 1 shows operating spectral range and output power of different models of vacuum and solid state electronic THz generators. Output power for both vacuum (backward wave oscillator or BWO) and solid state (varistor) devices declines substantially with increasing THz frequency. Limited spectral tunability of BWO's requires use of 6-8 different tubes to cover the spectral range from about 0.1 THz to about 1.45 THz. Spectral tunability of solid state devices is even more problematic, limiting spectroscopic applications of these sources. Early attempts to combine BWO's and solid state frequency multipliers resulted in very low output power (conversion efficiencies of about 1% or less for doubling and roughly order-of-magnitude reductions for successive harmonics; Tretyakov et al., "Compact tunable radiation source at 180-1500 GHz frequency range," *Int'l. J. of Infrared and Millimeter Waves*, Vol. 20 (8), p. 1443 (August 1999), incorporated by reference as if fully set forth herein).

An exemplary THz generator can comprise a combination of vacuum and solid state devices. In a specific example, a combination of a low frequency (less than about 200 GHz) backward wave oscillator (BWO) coupled through a single-mode waveguide to one of a selection of Schottky-diode-based frequency multipliers enables tunable THz generation from a compact source that provides relatively high power (greater than about 0.01 mW) across a relatively wide range of frequencies (from about 0.1 THz to about 1 THz or more). Such a combination THz tunable source is illustrated schematically in FIG. 2. The THz output of BWO 102 (in this example an Istok Model OV-86 BWO; other BWO's can be employed) is coupled by a single-mode THz waveguide 106 into frequency multiplier 104. In this example BWO 102 comprises an electro-vacuum diode producing 5-50 mW of THz output power over a range of 100-180 GHz (0.10-0.18 THz, as in the upper left curve of FIG. 1) when driven by a cathode voltage of 1-3 kV by power supply 110. Typical spectral bandwidth of the BWO is less than about 1-10 MHz. The frequency multiplier 104 can comprise a frequency doubler (Virginia Diodes Inc. Model WR3.4x2, for example; other doublers can be employed), a frequency tripler (Virginia Diodes Inc. Model WR2.2x3 or WR1.0x3, for example; other triplers can be employed), a doubler and a tripler, two triplers, or other combinations. The multipliers typically comprise varistors based on Schottky diodes and are typically passive devices, i.e., they require no input power or bias voltage. Other types of active or passive frequency multipliers can be employed.

Figure 3A:
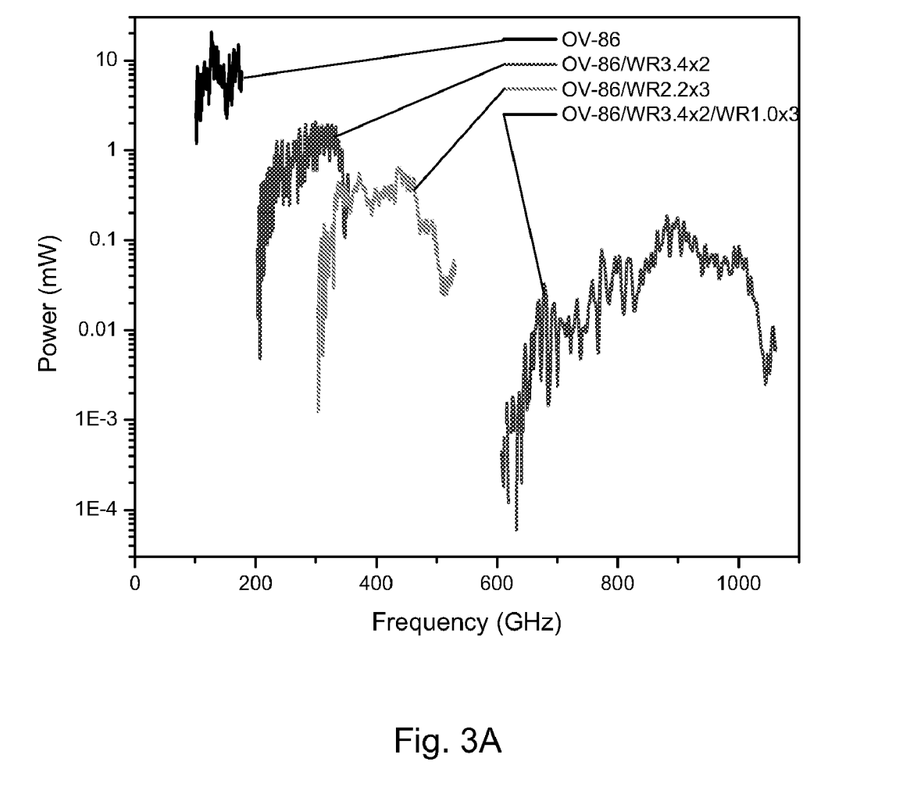
FIGS. 3A-3C illustrate frequency range, output power, and conversion efficiency for various exemplary terahertz sources arranged according to FIG. 2.

The frequency-multiplied output of multiplier 104 is directed from the multiplier by single-mode waveguide 108 (single mode for the output frequency, not for the fundamental frequency from the BWO). A multimode output waveguide can be employed instead. THz output power of some of BWO/multiplier combinations is shown in FIG. 3A, which shows THz output power greater than 0.01 mW (i.e., 10 µW) across most of the spectral range from about 0.1 THz up to about 1.1 THz. The output from two triplers (not shown) can remain above 5 µW up to about 1.6 THz. Residual radiation at the fundamental frequency (i.e., the BWO output frequency) is typically suppressed to below a detectable level.

Figure 4:
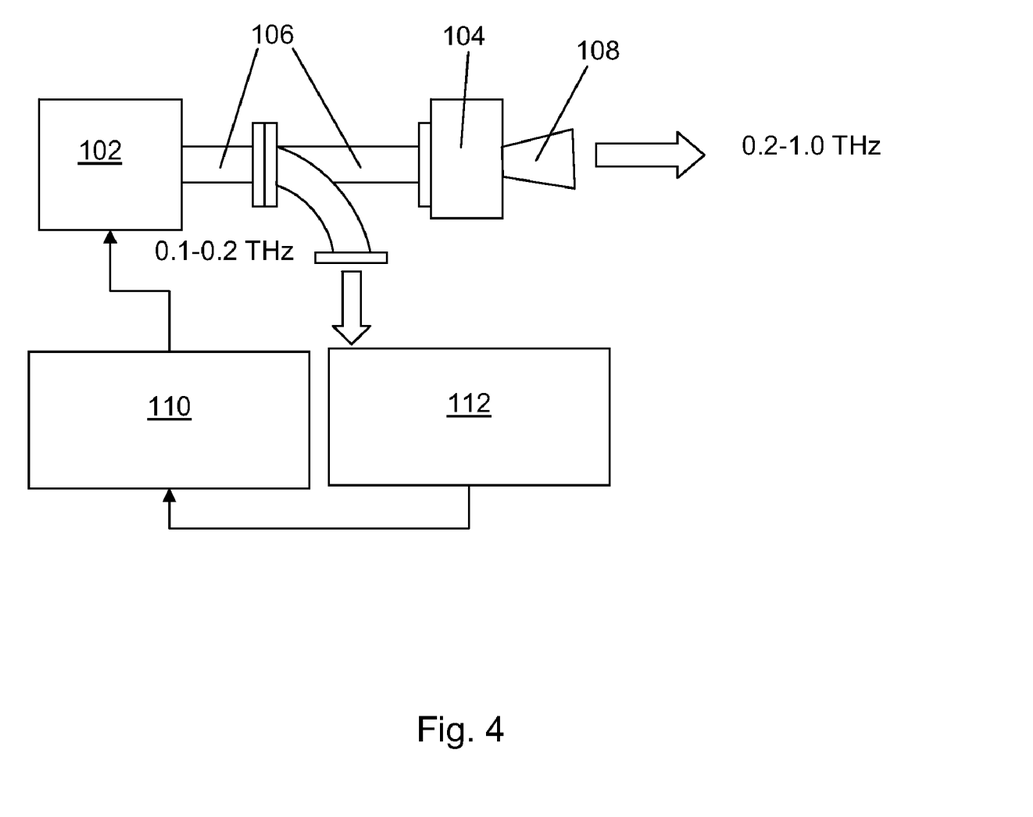
FIG. 4 illustrates schematically an exemplary terahertz source incorporating a BWO and a frequency multiplier.
Figure 5:
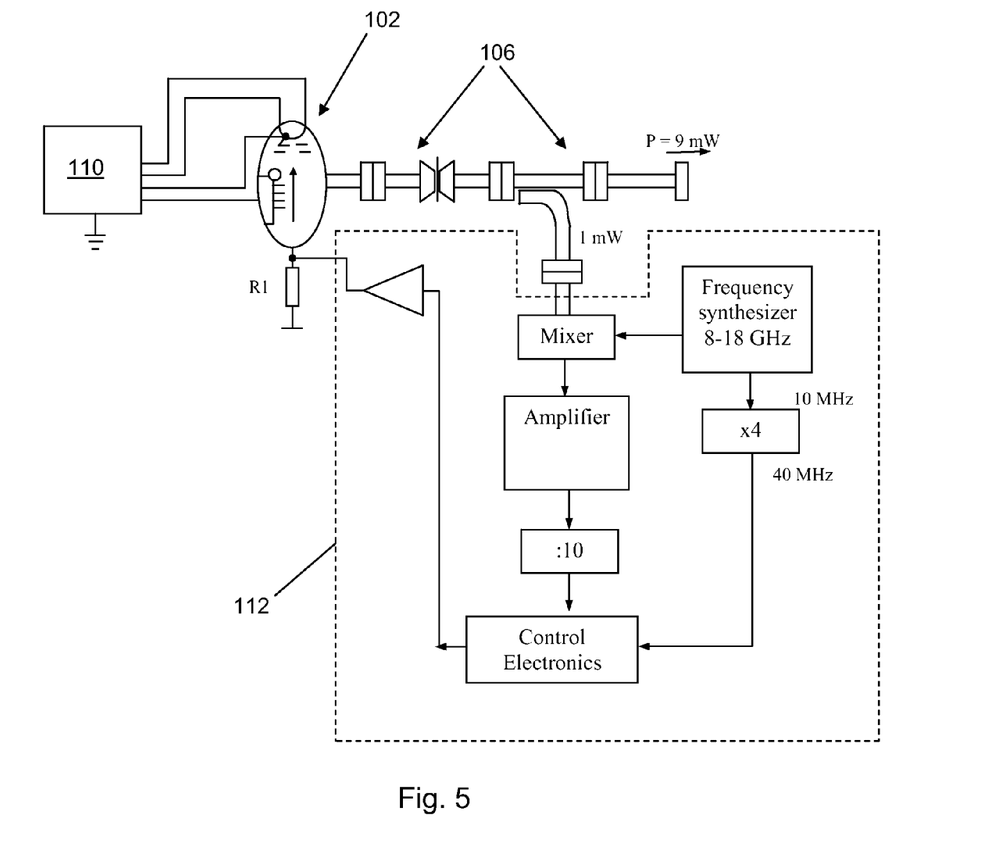
FIG. 5 illustrates schematically an exemplary frequency stabilization system usable with the terahertz source of FIG. 4.

It has been observed that the coupling of single mode waveguide 106 and frequency multiplier 104 to BWO 102 appears to enhance the output of BWO 102 over the fundamental terahertz frequency range, presumably also enhancing the output power of the terahertz generator over the harmonic frequency range. That effect can be characterized by comparing measured power of terahertz radiation exiting a splitter portion of waveguide 106 (as shown in FIGS. 4 and 5) with and without frequency multiplier 104 arranged to receive terahertz radiation from BWO 102 through waveguide 106. It is speculated that the presence of frequency multiplier 104 enables more optimal coupling of terahertz power out of the BWO, in a manner analogous to selection of an optimal output coupler in an optical laser. Regardless of the mechanism, this enhancement of terahertz power at the fundamental terahertz frequency is a consistently observed characteristic of the terahertz generator.

In a similar vein, it is often observed that one combination of a particular BWO chosen from a group of nominally identical BWO's (i.e., BWO's having the same model number obtained from the same vendor) and a particular frequency multiplier similarly chosen from a group of nominally identical frequency multipliers can produce substantially greater terahertz output power (in some instances up to a factor of 2, for example) over at least a portion of the harmonic frequency range than another such combination. Such differences are speculated to arise from subtle variations in coupling of terahertz power out of BWO 102 through waveguide 106 and into frequency multiplier 104. Regardless of the mechanism, a practical consequence of such variations is the desirability of "mixing and matching" BWO's and frequency multipliers to find optimal pairings (for all or a selected portion of the harmonic frequency range) when constructing a terahertz generator as described or claimed herein.

Figure 3B:
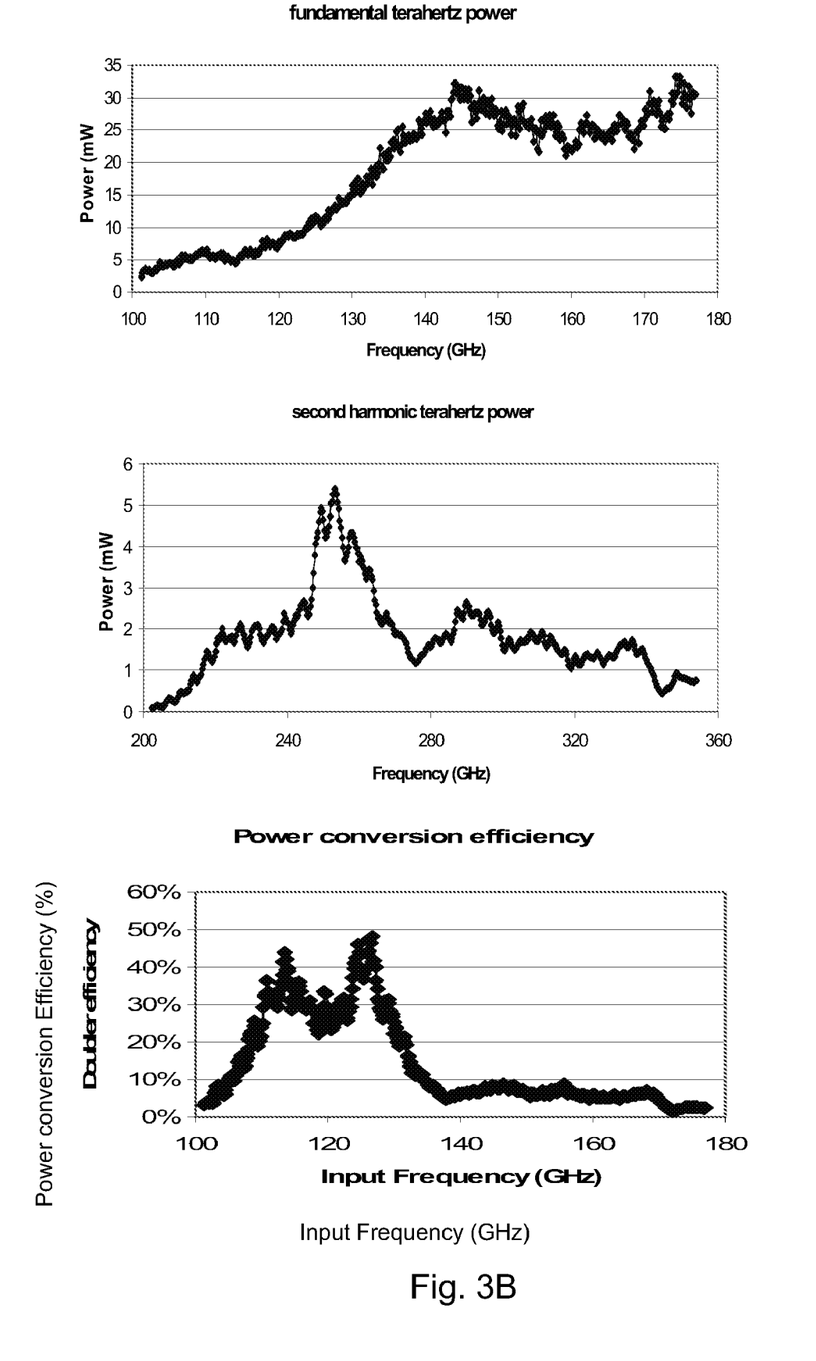

The output power of a particular BWO (Model OV-86), the output power of a frequency doubler coupled to that BWO, and the resulting conversion efficiency are shown in FIG. 3B. The conversion efficiency remains above about 5% between about 0.11 THz and about 0.17 THz, and remains above about 20% between about 0.11 THz and about 0.13 THz, approaching 50% between about 0.12 THz and about 0.13 THz. The enhanced conversion efficiency at fundamental terahertz frequencies between 0.11 THz and 0.13 THz is consistently observed for various BWO sources and different frequency multipliers (doublers, triplers, etc.) and somewhat compensates for the decreased output power of the BWO at these lower frequencies. This can yield more consistent terahertz harmonic output power versus frequency than might be expected based on the frequency dependence of the terahertz fundamental output power of the BWO.

Figure 2:
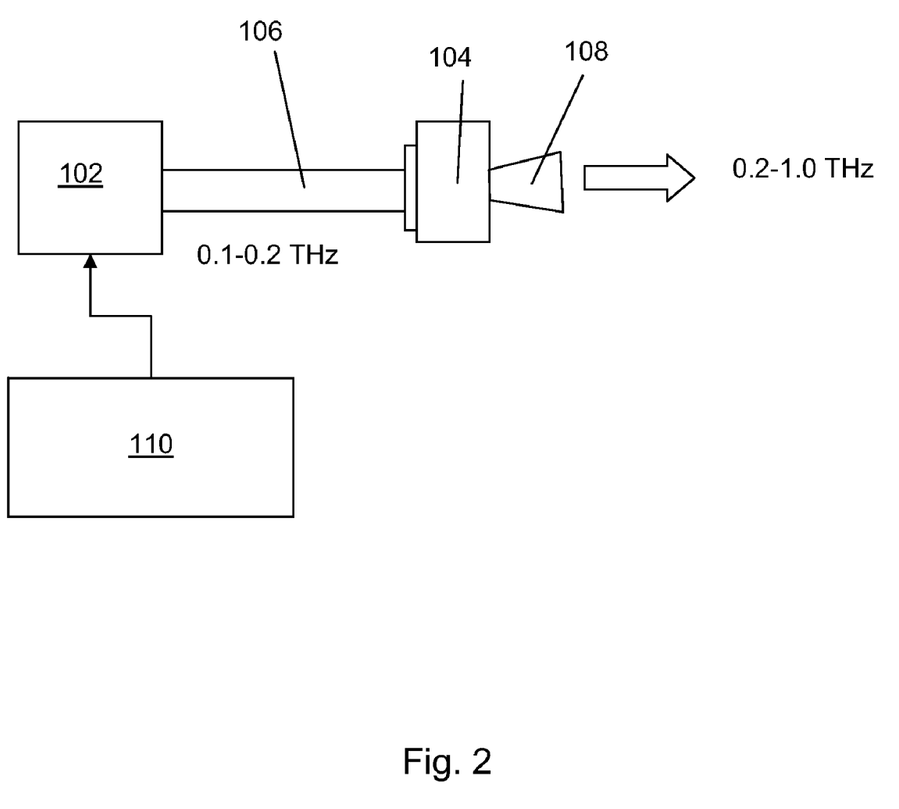
FIG. 2 illustrates schematically an exemplary terahertz source incorporating a BWO and a frequency multiplier.

Advantages of low THz frequency BWO's, such as the OV-86, include compact size, light weight, lower operating voltages, long operating lifetime, and ambient air cooling. Extending the operating range of such a low frequency BWO by combining it with one or more frequency multipliers offers a way to extend the operating frequency range without substantially increasing size and weight, reducing lifetime, or adding water cooling. For example, the THz tunable source of FIG. 2 typically consumes less than 200 W of electrical power and does not require water cooling. Dimensions of the instrument can be as small as 70 cm×40 cm×35 cm and the weight can be as little as 40 kg. The THz tunable source of FIG. 2 is thus suitable for applications in compact spectroscopic, imaging, or communications systems. Output power of low frequency BWO can be modulated internally by controlling the grid voltage, which can be an advantage in imaging and communication systems.

In contrast, at least five different BWO tubes would be typically required to cover the spectral range shown in FIG. 3A (if frequency multipliers were no used). However, practical uses of those devices are typically limited due to large size, large weight, limited lifetime, and a need for water cooling. These limitations become more readily apparent at higher frequencies (greater than about 0.4 THz, for example). Because generation of larger THz frequencies in a BWO requires larger applied magnetic fields, the weight and size of magnets required by the BWO increases substantially. Operation of higher THz frequency BWO's also requires higher cathode voltages, making such devices even less practical. This is illustrated in the following table, which lists examples of sizes, weights, voltage and magnetic field requirements, and cooling requirements for a variety of BWO's operating at a variety of THz frequencies.

| BWO type | Spectral range, GHz | Max. Cathode voltage, V | Required Magnetic field, Tesla | Magnet Size | Weight of BWO in a magnet | Cooling |
|---|---|---|---|---|---|---|
| OV-86 | 100-180 | 3,000 | 0.2 | 4" × 4" × 4" | 1 lb | Air |

-continued

| BWO type | Spectral range, GHz | Max. Cathode voltage, V | Required Magnetic field, Tesla | Magnet Size | Weight of BWO in a magnet | Cooling |
|---|---|---|---|---|---|---|
| OV-24 | 180-260 | 4,000 | 0.6 | 7" × 7" × 7" | 20 lb | Water |
| OV-30 | 260-370 | 4,000 | 0.7 | 9" × 9" × 9" | 40 lb | Water |
| OV-32 | 370-530 | 5,000 | 1.2 | 12" × 12" × 12" | 100 lb | Water |
| OV-80 | 530-700 | 6,000 | 1.2 | 12" × 12" × 12" | 100 lb | Water |
| OV-81 | 600-900 | 6,000 | 1.2 | 12" × 12" × 12" | 100 lb | Water |
| OV-82 | 900-1100 | 6,000 | 1.2 | 12" × 12" × 12" | 100 lb | Water |

Figure 3C:
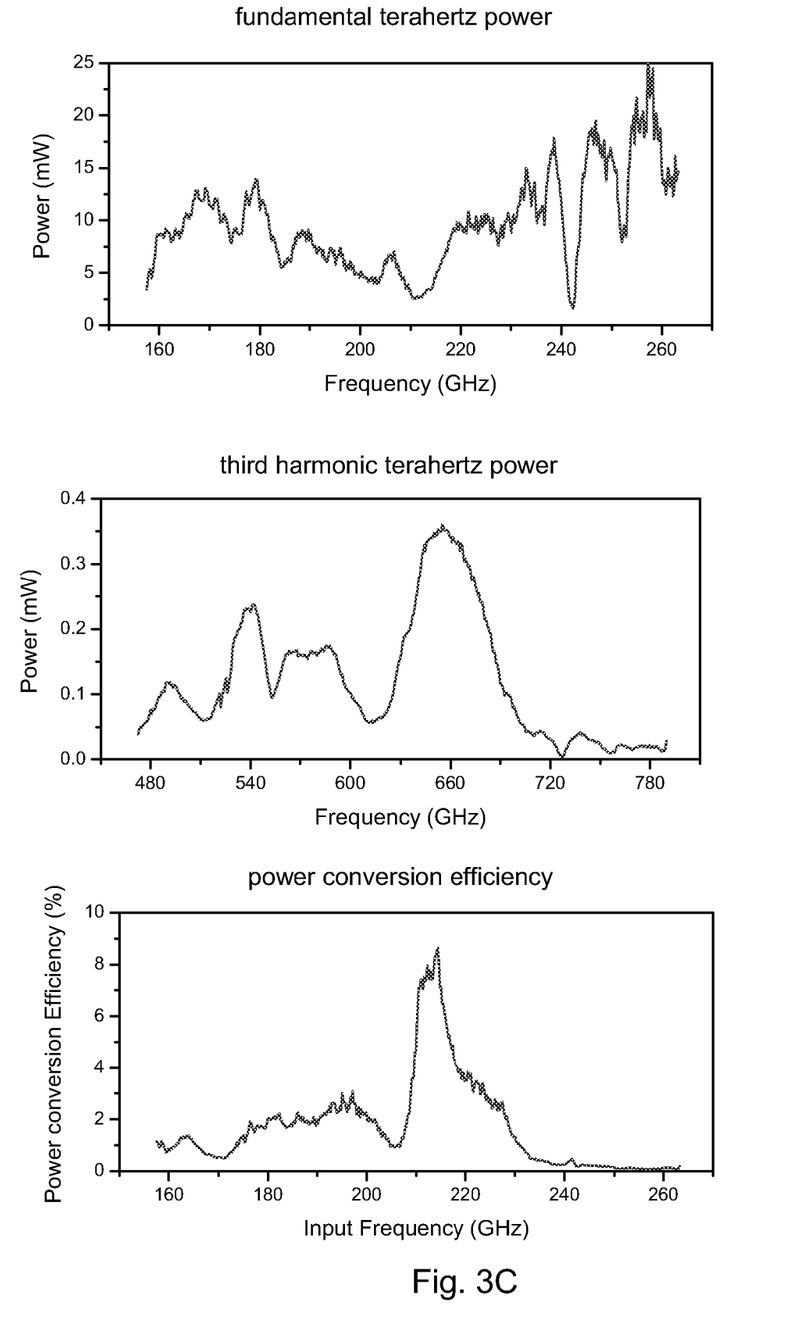

While use of a smaller, air-cooled BWO can be advantageous, other larger or water-cooled BWO's can be used within the scope of the present disclosure or appended claims. In one such example of a tunable terahertz radiation source, BWO 102 can comprise a BWO tunable between about 0.18 THz and about 0.26 THz (for example, an Istok OV-24) or between about 0.2 THz and about 0.37 THz (for example, an Istok OV-30). The terahertz output of one of those BWO's typically comprises multiple transverse spatial modes. It has been observed that terahertz output power at the harmonic frequency is enhanced when waveguide 106 acts as a so-called "mode stripper" (i.e., when waveguide 106 acts to substantially suppress propagation of higher-order transverse spatial modes within at least a portion of the fundamental terahertz frequency range). This enhancement appears to occur in spite of the presumable reduction of overall terahertz power reaching the frequency multiplier 104 through waveguide 106 at the fundamental terahertz frequency. The output power of one BWO (Model OV-24), the output power of a frequency tripler coupled to that BWO, and the resulting conversion efficiency are shown in FIG. 3C.

The voltage applied by BWO power supply 110 can be varied to in turn vary the frequency of the THz output of the BWO 102. Such tuning can be done in an open-loop arrangement (i.e., without any stabilization or feedback control, as in FIG. 2), or a frequency stabilization system 112 can be employed (as in FIG. 4). FIG. 5 shows a mode detailed schematic diagram of BWO 102, power supply 110, and frequency stabilization system 112 of FIG. 4 including an exemplary phase-locked loop (PLL) system for stabilizing the THz BWO output frequency. The PLL system can utilize a quartz-based frequency synthesizer as a frequency standard. Mixing the THz BWO output with a high frequency harmonic of the synthesizer signal enables the generation of an RF feedback signal that can be used to stabilize the BWO output frequency within a range less than about 100 kHz. Commercial PLL systems available for a BWO operating at frequencies below 200 GHz can be incorporated into the hybrid THz source of FIG. 4 to stabilize the frequency of the THz output across the entire tuning range, without resorting to much more complex PLL systems required for BWO stabilization at higher THz frequencies.

High resolution (about 100 kHz or better) spectral measurements using BWO's have been demonstrated in both single-frequency (using a phase-locked loop) and rapid scanning (sweep) modes. It is expected that the hybrid THz source of FIG. 4 would typically exhibit a similarly narrow spectral bandwidth. The frequency multipliers theoretically would degrade the phase noise of an input signal by a factor of 20*log(N), where N is the frequency multiplication factor. Phase noise measurements performed using the frequency multipliers described above have been observed to substantially conform to the theoretical phase noise equation.

A compact THz tunable source as disclosed or claimed herein can be used as a radiation source for a THz spectrometer or a THz imaging system, as described hereinbelow.

Scanning Terahertz Spectrometer

Figure 6:
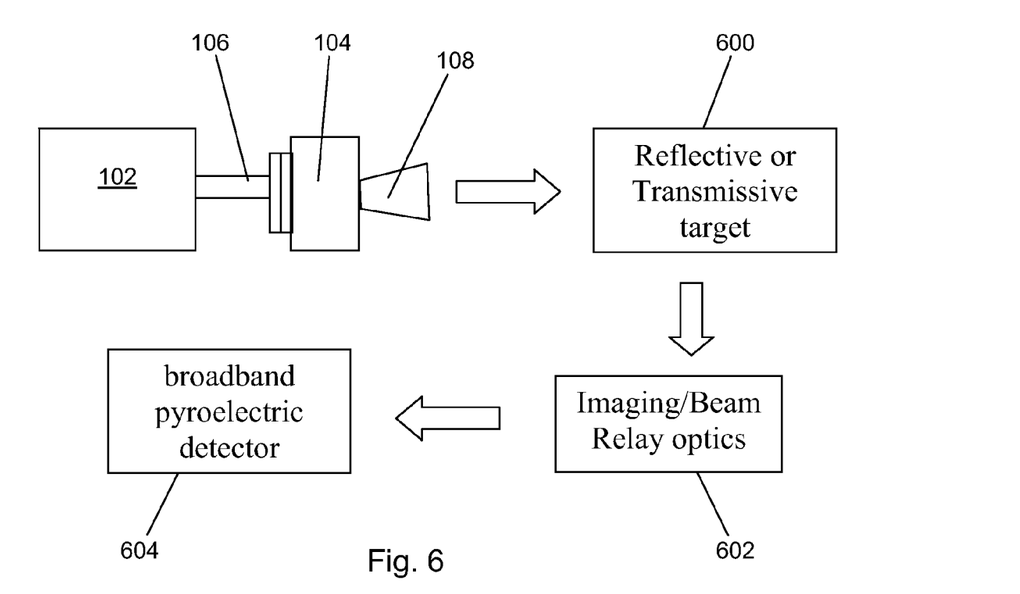
FIG. 6 illustrates schematically an exemplary terahertz spectrometer.
Figure 7:
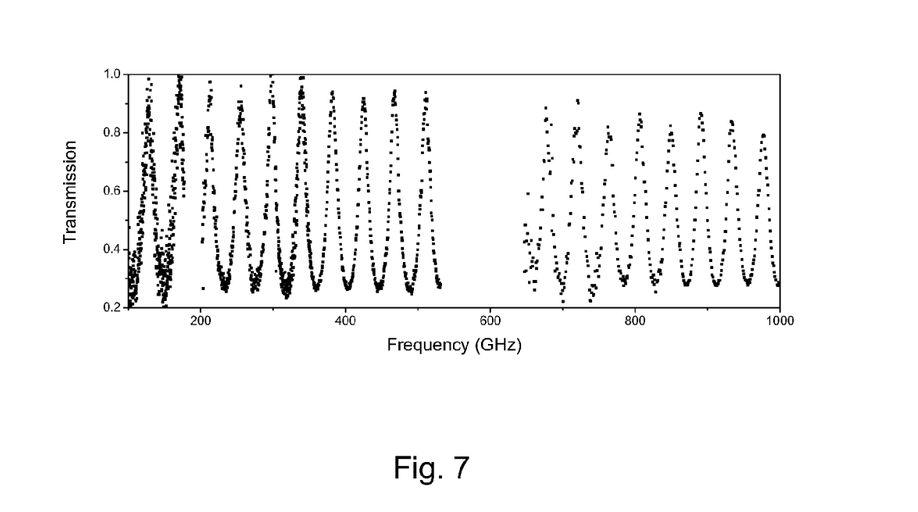
FIG. 7 illustrates schematically a spectrum acquired with the spectrometer of FIG. 6.

FIG. 6 illustrates schematically a scanning THz spectrometer employing the THz tunable source of FIG. 2 and a broadband pyroelectric detector. A similar scanning spectrometer can be based on the tunable THz source of FIG. 4. The THz output from the source is incident on a reflective or transmissive target or sample 600. Imaging or relay optics 602 of any suitable type direct THz radiation reflected from or transmitted by the target 600 to a broadband THz detector (broadband pyroelectric detector 604 in this example). Any suitable detector can be employed. The entire apparatus, including BWO power supply, doubler or tripler, and a data acquisition system, can fit into a 70 cm×40 cm×35 cm enclosure and can weigh less than 80 lb. The size and weight of the system can be further scaled down for applications requiring portability. FIG. 7 shows a measured transmission spectrum of a 1 mm thick GaAs wafer measured using the spectrometer of FIG. 6.

Terahertz Imaging System

Figure 8:
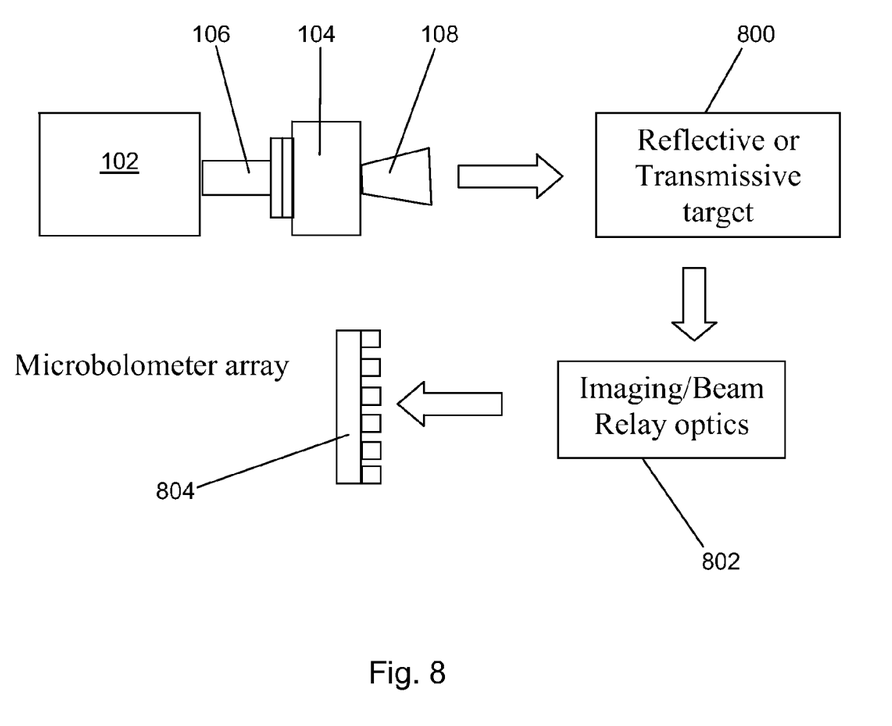
FIG. 8 illustrates schematically an exemplary terahertz imaging system.

FIG. 8 illustrates schematically an imaging system utilizing THz radiation for illuminating a target or sample. A THz tunable source similar to that shown in FIG. 2 (comprising a BWO 102 and a frequency multiplier 104) is shown illuminating a target 800. Imaging or beam relay optics 802 direct THz radiation from target 800 to a THz imaging array 804. Imaging array 804 can comprise a microbolometer focal plane array (FPA) for spatially-resolved direct detection of the THz radiation from the target. An uncooled array may be preferred for simplicity and convenience, while a cooled array can provide better sensitivity and reduced noise. An uncooled thermal detector array can be based on mature microbolometer focal plane array technology that is currently used in high definition long-wave IR (7-14 μm) imaging applications. For example, an uncooled IR camera based on vanadium oxide microbolometer FPA's can be employed, such as a BAE Systems SCC500L camera core (160×120 pixels on a 46 μm pitch) with modified front-end optics (currently designed for 8-14 μm operation). Since the BWO-based THz source is widely tunable, this scheme is amenable to multi-spectral imaging (i.e., acquiring multiple images at differing terahertz frequencies), which can provide a higher level of confidence in the accuracy or reliability of the acquired images. Real-time THz imaging with this particular camera has been demonstrated recently with a 10 mW, 2.52 THz, (λ=118.8 μm) far-infrared gas laser as the THz source (Hu et al., "Real-time, continuous-wave terahertz imaging by use of a microbolometer focal-plane array," Optics Letters, Vol. 30 (19), p. 2563 (2005), incorporated by reference as if fully set forth herein). THz images can be obtained at video rates up to about 60 frames/s with peak signal-to-noise ratio estimated to be 13 dB for a single frame of video acquired in 16 msec. Any other suitable THz imaging detector array can be employed as well.

Alternatively, a combination of CCD array, CMOS array, or other suitable visible or near-IR imaging detector can be used along with nonlinear upconversion of the THz radiation from the target to yield a THz image of the target. An exemplary arrangement is shown schematically in FIG. 9 for phase coherent homodyne detection of the target image. The output of THz source 902 is split by beamsplitter 904, with a first portion directed onto sample 900. THz radiation reflected from or transmitted by sample 900 is directed to beam combiner 906. A second portion of the THz output of source 902 is combined by beam combiner 905 with the output of a tunable single-frequency laser 908 operating in the visible or near-IR wavelength range. The THz and visible/near-IR beams propagate through a suitable nonresonant, nonlinear optical medium 910 to generate their sum frequency (also in the visible/near-IR), which constitutes an optical probe beam that is phase-coherent with the output of the THz source. This probe beam and the remaining laser output are combined with the THz radiation from the sample (i.e., the THz sample beam) by beam combiner 906 and mixed in a second nonresonant, nonlinear optical medium 912 (typically substantially identical to the first non-linear optical medium 910). Generation of the sum-frequency by the laser output and the THz sample beam in the non-linear medium 910 produces a visible/near-IR sample beam. After filtering out the residual light from laser 908 with filter 914, the visible/near-IR probe and sample beams are directed onto a suitable imaging detector array (CCD 916 in this example). In this homodyne detection scheme, the linear interference between the visible/near-IR probe and sample beams yields not only the THz amplitude, but also the relative phase of the THz field. In order to scan the phase over a full period of the THz signal to fully characterize the phase of the sample beam, a scanning delay line or an electro-optic phase modulator can be employed.

Using a substantially monochromatic THz beam to realize a frequency-domain rather than a time-domain approach to THz spectral imaging significantly simplifies propagation effects, signal processing requirements and computational complexity. Furthermore, the increased signal-to-noise in a given THz passband that can be achieved by using a tunable narrowband source provides several orders of magnitude higher spectral brightness than ultrafast laser-based broadband THz sources.

An advantage of the upconversion imaging is scheme over direct detection using microbolometers is that it translates the THz image into the visible/near-IR region where 2-D focal plane arrays, local oscillators (i.e., compact solid-state laser sources), and high-Q optical filters (for local oscillator rejection) are highly reliable, mature technologies that are readily available in compact field-deployable form. The up-conversion process requires only a suitable non-linear optical medium illuminated by a semiconductor laser, for example, allowing for detection using conventional photodiodes or detector arrays. In applications where two-dimensional imaging is desirable, the simultaneous conversion of a THz/LWIR image with a large pixel count into a visible image can be readily accomplished. Instead of an imaging detector array, a single visible/near-IR detector can be employed when spatial resolution of a sample signal is not required but amplitude and phase of the sample signal are required.

Figure 9:
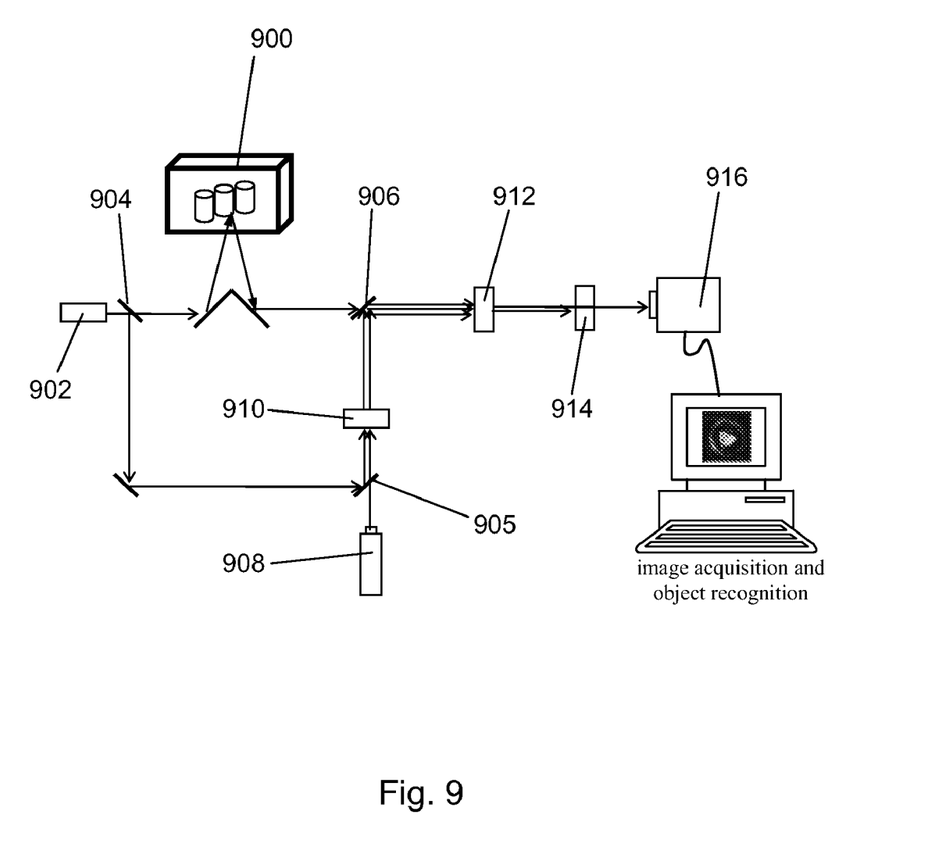
FIG. 9 illustrates schematically another exemplary terahertz imaging system.

Implementation of the system of FIG. 9 requires suitable non-linear optical media. Any suitable optical non-linear optical medium can be employed, including quasi-phase-matched (QPM) non-linear media. Some examples of suitable non-linear media or materials are disclosed in U.S. non-provisional application Ser. No. 11/357,722 filed Feb. 17, 2006 and incorporated by reference as if fully set forth herein. Large aperture QPM GaAs structures comprising stacks of plates can be employed, and may be well-suited for imaging applications. Such stacked non-linear media are disclosed in U.S. non-provisional application Ser. No. 11/675,940 filed Feb. 16, 2007 and incorporated by reference as if fully set forth herein.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", and "having" shall be construed as open ended terminology, with the same meaning as if the phrase "at least" were appended after each instance thereof.

What is claimed is:

1. An apparatus comprising:
    a tunable source of terahertz radiation at a fundamental terahertz frequency tunable over a fundamental terahertz frequency range;
    a first waveguide arranged to receive terahertz radiation from the tunable terahertz source, the first waveguide being arranged to support only a single transverse spatial mode within the fundamental terahertz frequency range;
    a solid-state frequency multiplier arranged to receive from the first waveguide at least a portion of the terahertz radiation of the tunable terahertz source and to produce harmonic terahertz radiation at a harmonic terahertz frequency, the harmonic terahertz frequency being an integer multiple of the fundamental terahertz frequency; and
    a second waveguide arranged to receive the harmonic terahertz radiation produced by the frequency multiplier, the second waveguide being arranged to support only a single transverse spatial mode at the harmonic terahertz frequency,
    wherein:
    the tunable terahertz source comprises a backward wave oscillator; and
    the first waveguide includes a splitter portion, and the tunable terahertz source, the first waveguide, and the frequency multiplier are arranged so that measured power of terahertz radiation exiting the splitter portion is greater with the frequency multiplier arranged to receive terahertz radiation from the backward wave oscillator through the waveguide than without the frequency multiplier so arranged.

2. An apparatus comprising:
    a tunable source of terahertz radiation at a fundamental terahertz frequency tunable over a fundamental terahertz frequency range;
    a first waveguide arranged to receive terahertz radiation from the tunable terahertz source, the first waveguide being arranged to support only a single transverse spatial mode within the fundamental terahertz frequency range;
    a solid-state frequency multiplier arranged to receive from the first waveguide at least a portion of the terahertz radiation of the tunable terahertz source and to produce harmonic terahertz radiation at a harmonic terahertz frequency, the harmonic terahertz frequency being an integer multiple of the fundamental terahertz frequency; and
    a second waveguide arranged to receive the harmonic terahertz radiation produced by the frequency multiplier, the second waveguide being arranged to support only a single transverse spatial mode at the harmonic terahertz frequency, wherein:
the tunable terahertz source comprises a backward wave oscillator;
the fundamental terahertz frequency range is about 0.10 THz to about 0.18 THz; and
the backward wave oscillator, the frequency multiplier, and the waveguides are arranged so as to exhibit conversion efficiency of the terahertz radiation to the harmonic terahertz radiation that is greater than about 5% for fundamental terahertz frequencies between about 0.11 THz and about 0.17 THz.

3. The apparatus of claim 2 wherein the frequency multiplier comprises at least one varistor.

4. The apparatus of claim 2 wherein the frequency multiplier comprises at least one Schottky diode.

5. The apparatus of claim 2 wherein the frequency multiplier comprises a frequency doubler, a frequency tripler, a pair of frequency doublers, a frequency doubler and a frequency tripler, or a pair of frequency triplers.

6. The apparatus of claim 2 wherein the tunable terahertz source comprises a backward wave oscillator selected from a set of nominally identical backward wave oscillators and the frequency multiplier comprises a Schottky diode varistor selected from a set of nominally identical Schottky diode varistors, each of the selected backward wave oscillator and Schottky diode varistor having been selected to yield an optimal level of output power at the harmonic terahertz frequency over at least a portion of the fundamental terahertz frequency range.

7. The apparatus of claim 2 further comprising a power supply and a phase-locked loop, the phase-locked loop being arranged so as to control a drive signal applied by the power supply and maintain the bandwidth of the terahertz radiation less than about 100 kHz.

8. The apparatus of claim 2 further comprising a broadband terahertz detector, wherein the detector is arranged so as to receive a portion of the harmonic terahertz radiation that is reflected from or transmitted by a sample.

9. The apparatus of claim 8 wherein the detector comprises a pyroelectric detector.

10. The apparatus of claim 2 further comprising a terahertz imaging detector array, wherein the detector array is arranged so as to receive a portion of the harmonic terahertz radiation that is reflected from or transmitted by a sample and to produce an image therefrom.

11. The apparatus of claim 10 wherein the detector array comprises a microbolometer array.

12. An apparatus comprising:
a tunable source of terahertz radiation at a fundamental terahertz frequency tunable over a fundamental terahertz frequency range;
a first waveguide arranged to receive terahertz radiation from the tunable terahertz source, the first waveguide being arranged to support only a single transverse spatial mode within the fundamental terahertz frequency range;
a solid-state frequency multiplier arranged to receive from the first waveguide at least a portion of the terahertz radiation of the tunable terahertz source and to produce harmonic terahertz radiation at a harmonic terahertz frequency, the harmonic terahertz frequency being an integer multiple of the fundamental terahertz frequency; and
a second waveguide arranged to receive the harmonic terahertz radiation produced by the frequency multiplier, the second waveguide being arranged to support only a single transverse spatial mode at the harmonic terahertz frequency, wherein:
the tunable terahertz source comprises a backward wave oscillator;
the fundamental terahertz frequency range is about 0.10 THz to about 0.18 THz; and
the backward wave oscillator, the frequency multiplier, and the waveguides are arranged so as to exhibit conversion efficiency of the terahertz radiation to the harmonic terahertz radiation that is greater than about 20% for fundamental terahertz frequencies between about 0.11 THz and about 0.13 THz.

13. An apparatus comprising:
a tunable source of terahertz radiation at a fundamental terahertz frequency tunable over a fundamental terahertz frequency range;
a first waveguide arranged to receive terahertz radiation from the tunable terahertz source, the first waveguide being arranged to support only a single transverse spatial mode within the fundamental terahertz frequency range;
a solid-state frequency multiplier arranged to receive from the first waveguide at least a portion of the terahertz radiation of the tunable terahertz source and to produce harmonic terahertz radiation at a harmonic terahertz frequency, the harmonic terahertz frequency being an integer multiple of the fundamental terahertz frequency;
a second waveguide arranged to receive the harmonic terahertz radiation produced by the frequency multiplier, the second waveguide being arranged to support only a single transverse spatial mode at the harmonic terahertz frequency;
a first beamsplitter arranged to divide the harmonic terahertz radiation into first and second terahertz beams;
a source of optical radiation in the visible or near-IR wavelength range;
a second beamsplitter arranged to combine the optical radiation and the first terahertz beam;
a first non-linear optical medium arranged to generate an optical probe beam from the optical radiation and the first terahertz beam;
at least one optical element arranged to direct the second terahertz beam to a sample;
a third beamsplitter for combining a portion of the second terahertz beam that is transmitted by or reflected from the sample with the optical probe beam with the optical radiation;
a second non-linear optical medium arranged to generate an optical signal beam from the optical radiation and the second terahertz beam;
an optical filter or polarizer arranged to separate the optical radiation from the optical signal and probe beams; and
an imaging photodetector array for detecting the combined optical signal and probe beams.

14. A terahertz imaging system comprising:
a tunable source of terahertz radiation;
a first beamsplitter arranged to divide the terahertz radiation into first and second terahertz beams;
a source of optical radiation in the visible or near-IR wavelength range;
a second beamsplitter arranged to combine the optical radiation and the first terahertz beam;
a first non-linear optical medium arranged to generate an optical probe beam from the optical radiation and the first terahertz beam;
at least one optical element arranged to direct the second terahertz beam to a sample;

a third beamsplitter for combining a portion of the second terahertz beam that is transmitted by or reflected from the sample with the optical probe beam with the optical radiation;

a second non-linear optical medium arranged to generate an optical signal beam from the optical radiation and the second terahertz beam;

an optical filter or polarizer arranged to separate the optical radiation from the optical signal and probe beams; and an imaging photodetector array for detecting the combined optical signal and probe beams.

* * * * *